US005260724A

United States Patent [19]

Tomii et al.

[11] Patent Number: 5,260,724

[45] Date of Patent: Nov. 9, 1993

[54] CAPPING DEVICE FOR INK JET PRINTER

[75] Inventors: Tsuyoshi Tomii; Seiji Mochizuki; Yukihiro Hanaoka; Toshio Kumagai; Hitoshi Hayakawa, all of Nagano, Japan

[73] Assignee: Seiko Epson Corporation, Tokyo, Japan

[21] Appl. No.: 814,825

[22] Filed: Dec. 31, 1991

[30] Foreign Application Priority Data

Jan. 9, 1991 [JP] Japan .......................................... 3-946
Mar. 7, 1991 [JP] Japan .............................. 3-20455[U]
Jul. 1, 1991 [JP] Japan ................................. 3-160345

[51] Int. Cl.[5] .......................................... G01D 15/18
[52] U.S. Cl. ................................ 346/140 R; 346/1.1; 346/75
[58] Field of Search ....................... 346/1.1, 140 R, 75

[56] References Cited

U.S. PATENT DOCUMENTS 4,045,802 8/1977 Fukazawa et al. ............ 346/140 R
4,533,927 8/1985 Iwagami et al. ............... 346/140 R
4,543,591 9/1985 Terasawa ....................... 346/140 R
4,556,894 12/1985 Terasawa ...................... 346/140 R
4,600,931 7/1986 Terasawa ....................... 346/140 R
4,646,111 2/1987 Shimosato et al. ............ 346/140 R
4,728,970 3/1988 Terasawa ....................... 346/140 R
4,734,719 3/1988 Suzuki ........................... 346/140 R
4,825,231 4/1989 Nozaki ........................... 346/140 R
4,937,595 6/1990 Midorikawa .................... 346/140 R
4,970,534 11/1990 Terasawa et al. ............. 346/140 R
5,166,708 11/1992 Hirano et al. .................. 346/140 R
5,182,582 1/1993 Okamura ........................ 346/140 R

*Primary Examiner*—A. T. Grimley
*Assistant Examiner*—Thu Dang
*Attorney, Agent, or Firm*—Sughrue, Mion, Zinn, Macpeak & Seas

[57] ABSTRACT

According to the present invention, there is disclosed a capping device for an ink jet printer which is constructed such that a cap supporting member 14, adapted to move from the non-capping position to the capping position by the thrust action of a carriage 3, is arranged on the home position side of the ink jet printer so that the outer end part of the cap supporting member 14 is displaced toward the nozzle surface of a printing head 4 with the aid of a guide surface 15*b* having an inclined surface 15*a*, until a cap 5 on the cap supporting member 14 is brought into close contact with the nozzle surface of the printing head 4 with an adequate intensity of thrust force by means of a turnable lever 8 operatively connected to the inner end of the cap supporting member 14, while resilient force of a cap spring 11 is exerted on the base end part of the turnable lever 8 so as to normally bias the cap supporting member 14 in the direction toward the printing head 4.

13 Claims, 7 Drawing Sheets

CAPPING DEVICE FOR INK JET PRINTER

BACKGROUND OF THE INVENTION

1. Field of the Invention

The present invention relates to a capping device for shutting an ink injection port of an ink jet printer.

2. Description of the Related Art

In an ink jet printer of the type where ink pressurized in a pressure chamber is injected onto a recording medium in the form of a number of fine ink droplets to write recorded data, recorded information or the like with the injected ink, it has been found that there is a possibility that a proper writing operation fails to be performed due to an increase of viscosity of the ink caused by vaporization of an ink solvent, drying of the ink, adhesion of dusts, entrapping air bubbles in the ink or the like. To obviate the foregoing malfunction, many proposals have been made to provide a sealing means for the foregoing type of ink jet printer so as to seal an ink injection port with suitable means while the ink jet printer is held in an inoperative state.

One of these proposals is disclosed in an official gazette of Japanese Unexamined Patent Publication (Kokai) No. 1-125239. According to this publication, a sealing device is constructed such that a sleigh, adapted to slidably move by the thrust action of a carriage displaced from the home position, comes near to the lower surface of a printing head with the aid of an inclined guide surface, and a cap molded of an elastic material and placed on the surface of the sleigh is then brought in pressure contact with the lower surface of the printing head so as to seal the injection port of an ink nozzle with the cap.

Another proposal is disclosed in an official gazette of Japanese Examined Publication Patent (Kokoku) No. 2-13910. According to this invention, a sealing device includes two arms as parallel links which are interposed between a frame and a cap so as to allow the cap to come into pressure contact with the lower surface of a printing head. As the cap is displaced in the transverse direction by a carriage, it is also displaced in the direction toward the printing head at a right angle relative to the transverse displacement thereof.

However, with respect to the conventional sealing devices constructed as described above, due to the fact that the quantity of displacement of the cap at a right angle relative to the transverse displacement of the same is restricted by the inclined guide surface and the parallel links, when a distance between the locus of displacement of the carriage and the frame slightly fluctuates due to errors associated with machining operations performed for parts or an assembling operation performed for the parts, or when a distance between a platen and the printing head is adjusted for the purpose of printing data on a paper having a heavy thickness such as an envelope or the like, a distance between the printing head and the cap varies correspondingly. For this reason, a sealing function for the injection port on the nozzle is dependent mainly on the elastic deformation of the cap itself. This does not lead to a significant problem as long as the sealing device has a small sealing surface, but in a case where the printing head includes many nozzles, it becomes very difficult to uniformly seal the whole surface of the printing head with a cap.

Another proposal is disclosed in an official gazette of Japanese Unexamined Patent Publication (Kokai) No. 59-1037862. According to this invention, a sealing device is constructed such that an inverted L-shaped head protective covering is turnably supported at the home position in a one-point supporting fashion so that the head protective cover is turned by a carriage displaced to the home position, causing a cap disposed at one end of the carriage to come into pressure contact with the surface of a printing head.

With the conventional sealing device constructed as described above, since a quantity of turning movement of the head protective covering varies depending on a distance between the cap and the nozzle surface, a reliable sealing function can be assured for a printer adapted to adjust a distance between a platen and a printing head as desired. However, due to the fact that the direction of displacement of the printing head is different from the direction of displacement of the cap, the cap is unnecessarily deformed because of relative displacement between the printing head and the cap. Thus, there arises a problem where the cap is undesirably damaged or broken within a short period of time.

In addition, in order to provide sealing means to close the ink jetting port when the recording device is not in operation, a variety of sealing means have been proposed in the art. In general, the sealing means thus proposed is designed as follows. That is, as disclosed by Japanese Patent Application (OPI) No's 150035/1977 and 238751/1987, a cap member which is so driven as to come in and out of the route of movement of a recording head is arranged at a home position outside a printing region, and, when a carriage is returned to the home position after a recording operation, the cap member held at a retracting position is moved out as soon as the carriage is stopped, thus sealing (or closing) the ink jetting port without slipping on the head surface.

That is, in the conventional ink jet type recording device, the sealing operation is accomplished with a delay time after the recording head returns its home position. Therefore, if the main switch is turned off immediately when the recording head is returned to the home position, then the ink jetting port will not be closed, and accordingly the ink in it may be dried. As a result, the ink jetting port may be clogged up with the ink thus dried. In addition, if the recording device is vibrated for instance when transported, the cap member may be displaced. If this displacement occurs, then the ink may drip, making dirty around the recording device. Furthermore, in the conventional ink jet type recording device, it is necessary to move the cap member to the retracting position for every printing operation. Hence, it takes much time for the conventional ink jet type recording device to start the recording operation.

SUMMARY OF THE INVENTION

The present invention has been made in consideration of the aforementioned problems.

An object of the present invention is to provide a capping device for an ink jet printer which assures that a cap is brought into close contact with the nozzle surface of a printing head with an adequate intensity of thrust force without any displacement of the cap relative to a head surface.

Another object of the present invention is to provide a capping device for an ink jet printer which assures that the cap is correctly brought into close contact with the nozzle surface of the printing head irrespective of the present attitude assumed by the printing head.

Further object of the present invention is to provide a novel ink jet type recording device in which, when the recording head is returned to its home position, the ink jetting port is automatically sealed without delay, and when the recording head is moved to the printing region, the ink jetting port is automatically opened.

According to the present invention, there is provided a capping device for an ink jet printer wherein the capping device comprises a cap supporting means arranged outside of the effective writing region to move between the non-capping position and the capping position while it is squeezed by a carriage having a printing head carried thereon, a displacing means for displacing the cap supporting means in the direction toward the nozzle surface of the printing head as the cap supporting means is displaced from the non-capping position to the capping position, and a biasing means for biasing the cap supporting means in the direction toward the printing head so as to allow a cap on the cap supporting means to come into close contact with the nozzle surface of the printing head, by the action of the biasing means of which biasing force is exerted on at least one Of the displacing means.

With the capping device of the present invention, as the cap supporting means is displaced in the transverse direction by the thrust action of a carriage, it is increasingly displaced toward the nozzle surface of a printing head in the direction forming a right angle relative to the transverse displacement of the cap supporting means, until it is brought into close contact with the nozzle surface of the printing head with an adequate intensity of thrust force by the action of the biasing force exerted on the displacing means.

Since the cap is turnably supported by a spherical projection at the central portion of the bottom surface thereof in a one-point supporting fashion, the cap can be freely turned to assume an attitude in parallel with the nozzle surface of the printing head.

The foregoing further object of the invention has been achieved by the provision of an ink jet type recording device in which, according to the invention, an ink jetting port sealing member is arranged along the route of movement of a recording head and outside a printing region thereof in such a manner that the ink jetting port sealing member, abutting against a part of the recording head, is moved together with the recording head, and is moved in a direction perpendicular to the direction of movement of the recording head between a first position where the ink jetting port sealing member is away from the surface of the recording head which includes an ink jetting port and a second position where the ink jetting port sealing member seals the ink jetting port, and a retaining member is arranged at the second position which is adapted to position and retain the ink jetting port sealing member for a period of time which elapses from the time instant that the ink jetting port sealing member moves to the second position until a negative pressure is formed in the jetting port sealing member.

In the recording device thus designed, as the recording head is moved outside the printing region, the sealing member is moved to the sealing position to seal the ink jetting port of the recording head, and at the same time the sealing member and the recording head are fixedly positioned with the retaining member which is allowed to go in and out of the sealing position. Furthermore, when a negative pressure is formed in the sealing member, the sealing member and the recording head are released from the retaining member, so that the following printing operation can be started quickly.

Other objects, features and advantages of the present invention will become apparent from reading of the following description which has been made in conjunction with the accompanying drawings.

BRIEF DESCRIPTION OF THE DRAWINGS

The present invention is illustrated in the following drawings, in which.

Figure 1:
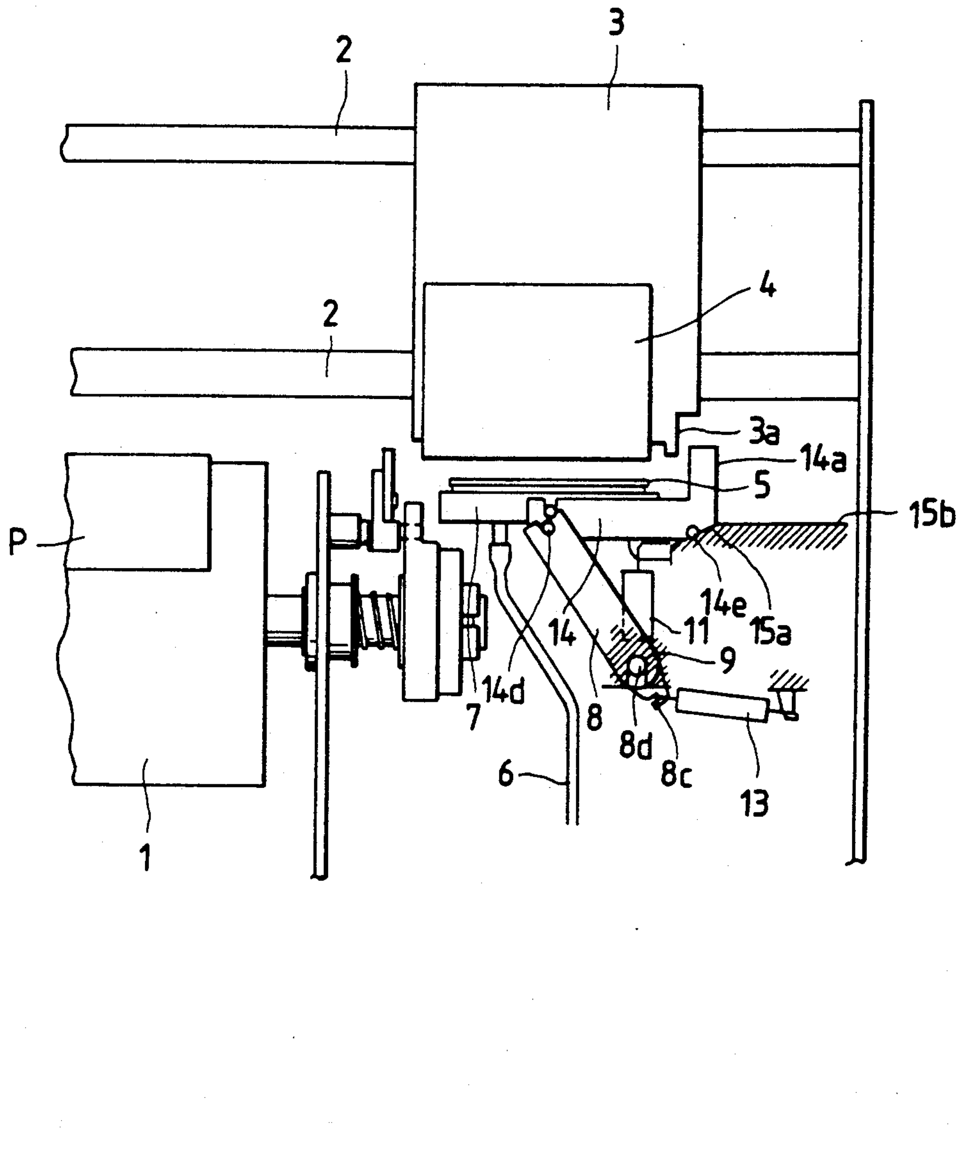
FIG. 1 is a plan view of a capping device for an ink jet printer, particularly illustrating an inoperative state of the capping device before an ink jet port on a printing head is shut by the capping device.

The parts (a) through (d) of FIG. 12 are explanatory diagrams showing steps of operating the sealing cap.

DESCRIPTION OF THE PREFERRED EMBODIMENT

The present invention will be described in detail hereinafter with reference to the accompanying drawings which illustrate preferred embodiments of the present invention.

FIG. 1 to FIG. 5 show a capping device for an ink jet type printer in accordance with a first embodiment of the present invention.

The printer is provided with a cap supporting member 14 adapted to move along a carriage guide 2 between the capping position and the non-capping position, on the home position side thereof.

A cap 5 is mounted on the cap supporting member 14 via a cap fixing member 7 to be described later. When the carriage 3 is held at the home position, the nozzle surface of a printing head 4 is closed with the cap 5 while it is kept wet. A tube 6 connected to a head restoring means (not shown) is fixedly secured to the cap 5 so that ink is recovered from a nozzle when a malfunction of incorrect ink injection arises with the printing head 4.

In addition, the cap supporting member 14 includes a projecting piece 14*a* at the outer end thereof, so as to allow it to move to the capping position via a projection 3*a*, at the outer end of the carriage 3, adapted to collide with the projecting piece 14*a* when the carriage 3 is displaced to the home position from the left-hand side of the printer as seen in the drawing. A pin 14*d* stands upright on the cap supporting member 14 at the inner end, while another pin 14*e* stands upright on the cap supporting member 14 at the outer end of the same. The inner pin 14*d* is pivotally connected to the foremost end of a cap supporting lever 8 to be described later. On the other hand, movement of the outer pin 14*e* is guided along a guide surface 15*b* in such a manner as to allow the cap supporting member 14 to come nearer to a nozzle at the capping position.

Specifically, to assure that the cap supporting member 14 is displaced to the capping position from the non-capping position, the frame is formed with an inclined surface 15*a* which extends from the guide surface 15*b*. Thus, the outer pin 14*e* slidably moves along the inclined surface 15*a* and the inner pin 14*d* is pivotally connected to the foremost end of the turnable cap supporting lever 8, whereby the cap supporting member 14 is displaced in the direction toward the nozzle surface of a printing head 4 while maintaining the horizontal position as it is displaced from the left-hand side to the right-hand side by the cap supporting lever 8 while slidably moving along the guide surface 15*b*.

Figure 3:
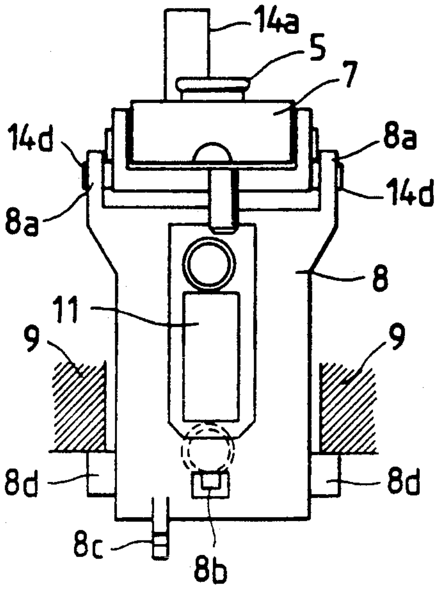
FIG. 3 is a fragmentary enlarged front view of the capping device.

A pin 8*d* stands upright at the base end of the cap supporting lever 8 while it is received in an inverted U-shaped groove 9 which extends in the direction toward the cap supporting member 14. Thus, the cap supporting lever 8 is turnably supported to turn about the pin 8*d* in the inverted U-shaped groove 9. As shown in FIG. 3, the cap supporting lever 8 is normally biased in the direction toward the cap supporting member 14 by the action of a cap spring 11 of which resilient force is exerted on a spring hanger 8*b* projecting from the lower end of the cap supporting lever 8, whereby the cap 5 is forcibly brought into contact with the nozzle surface of the printing head 4 with an adequate intensity of contact pressure, while the cap supporting member 8 is held at the capping position. In addition, the cap supporting lever 8 includes a spring hanger 8*c* on the base end side thereof with which a return spring 13 is transversely engaged so as to allow the cap supporting lever 8 to be normally turned in the counter-clockwise direction as seen in the drawing. In other words, the cap supporting member 14 is normally loaded with a turning force which is effective for displacing the cap supporting member 14 toward the non-capping position.

Figure 5:
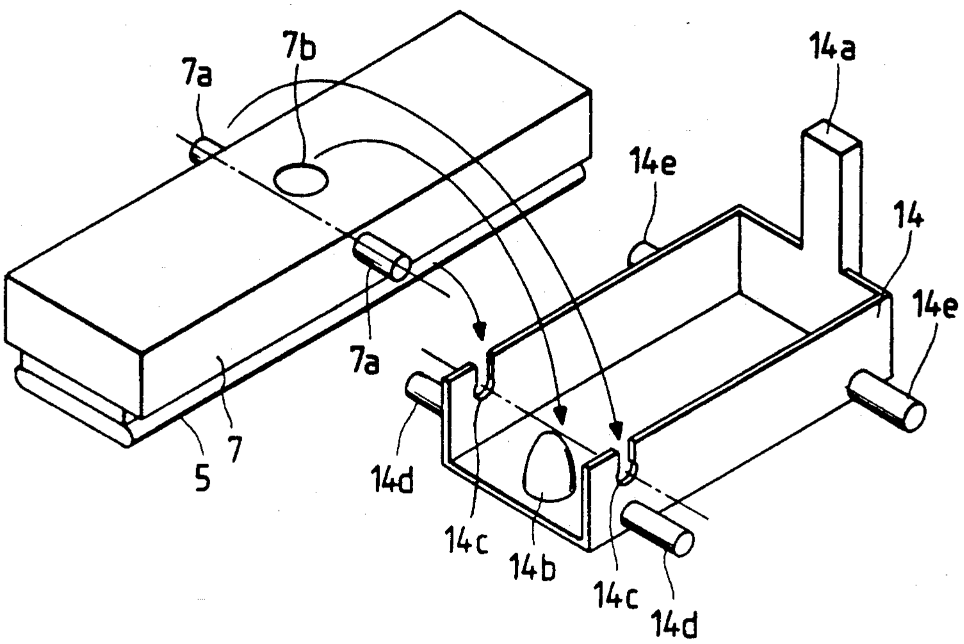
FIG. 5 is a perspective view of a cap supporting structure for the capping device.

As shown in FIG. 5, the cap supporting member 14 is designed in an elongated box-shaped configuration including opposite side walls, a bottom wall, a rear wall, and front and upper surfaces which are opened to the outside. The cap supporting member 14 is provided with a hemi-spherical projection 14*b* at the central position on the bottom plate in the vicinity of the front end of the same. In addition, the cap supporting member 14 is formed with vertical recesses 14*c* at the positions substantially corresponding to the position of the hemi-spherical projection 14*c*. An elongated cap fixing member 7, having a cap 5 fixedly secured thereto, is received in the box-shaped cap supporting member 14 in such a manner that the hemi-spherical projection 14*b* is fitted into a recess 7*b*. Pins 7*a* project outside of the opposite side walls of the cap fixing member 7 and are loosely inserted into the recesses 14*c* in order to assure that the cap fixing member 7 slightly turns about the pins 7*a* inserted into the recesses 14*c*, causing the cap 5 to reliably come into close contact with the nozzle surface of the printing head 4.

Next, capping operation of the capping device for an ink jet type printer constructed in the above-described manner will be described below.

A printing operation is performed such that recorded information is printed on a recorded paper P in response to writing signals, while the printing head 4 carried on the carriage 3 is located opposite to the printing paper P and the carriage 3 reciprocally moves within an effective image region of the recording paper P during the printing operation.

As shown in FIG. 1, while the carriage 3 stays on the home position side, the carriage supporting lever 8 is turnably displaced to the position corresponding to about 10 o'clock of a watch by the action of the return spring 13, so that the cap supporting member 14 is held at the non-capping position via the pin 14*d* pivotally connected to the foremost end of the carriage supporting lever 8.

Figure 4:
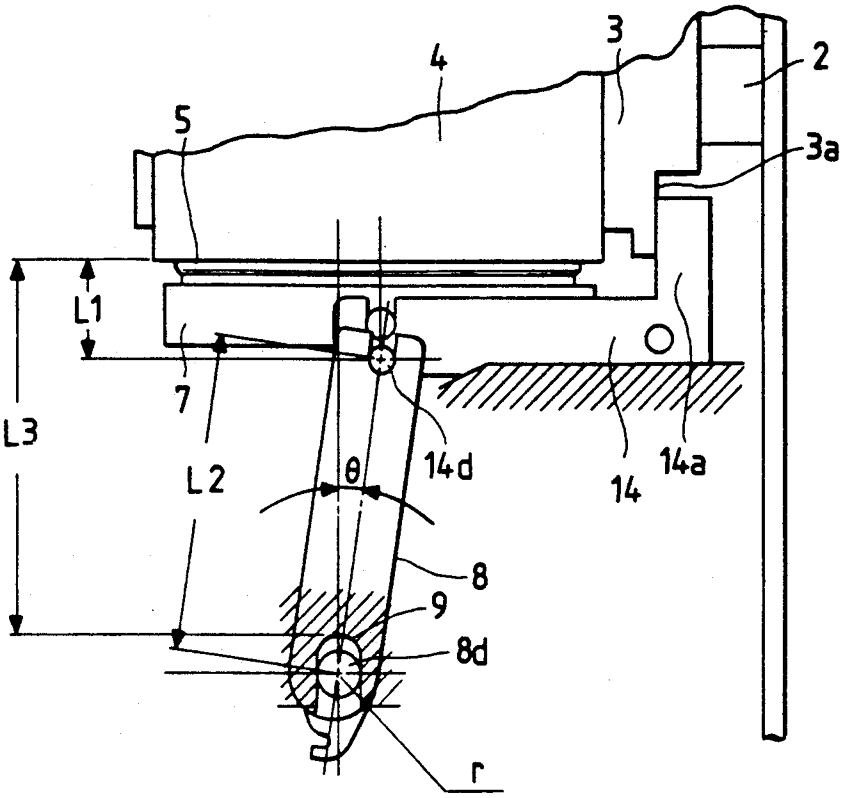
FIG. 4 is a plan view of the capping device, particularly illustrating a dimensional relationship among components constituting the capping device.

When the carriage 3 returns to the home position after completion of a desired printing operation, the projection 3*a* of the carriage 3 thrusts the projecting piece 14*a* of the carriage 3 to displace the cap supporting member 14 in the rightward direction as seen in FIG. 4.

Figure 2:
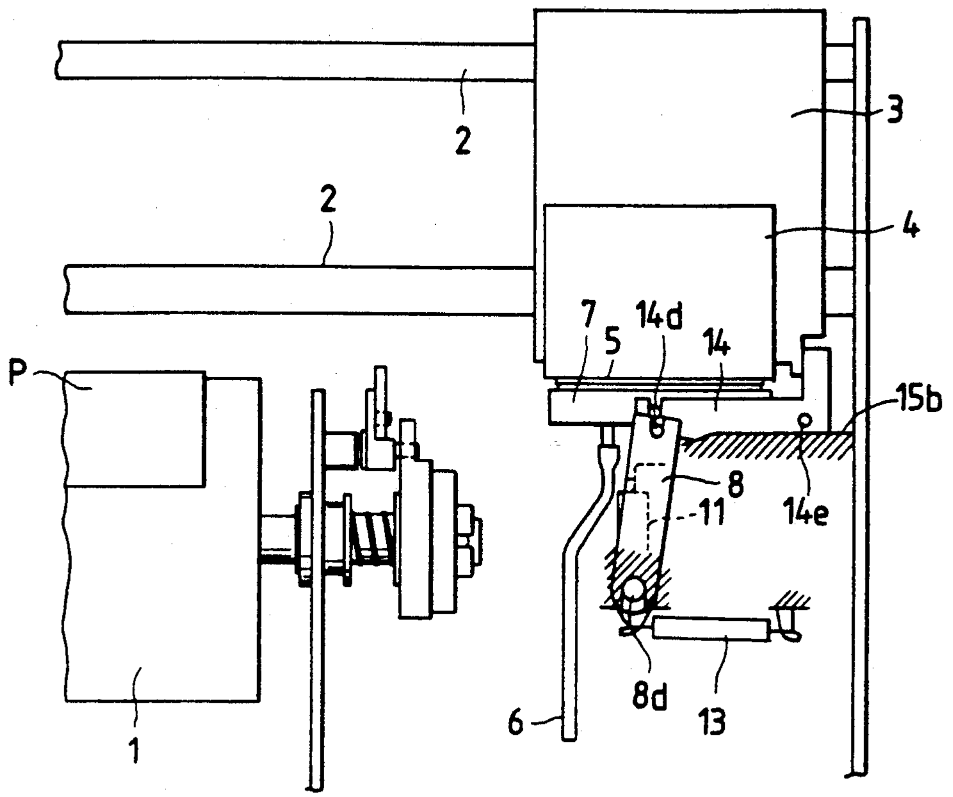
FIG. 2 is a plan view of the capping device in FIG. 1, particularly illustrating that the ink jet port has been shut by the capping device.

Then, a pin 14*e* at the right-hand end of the cap supporting member 14, slidably moves along the inclined surface 15*a*, whereby the cap supporting member 14 is increasingly displaced to the position nearer to the nozzle surface of the printing head 4. At this time, as shown in FIG. 2, the cap supporting lever 8 operatively connected to the pin 14*d* of the cap supporting member 14, is turnably displaced from the position corresponding to about 10 o'clock of a watch to the position corresponding to about one o'clock, causing the inner end of the cap supporting member 14 to be displaced toward to the nozzle surface of the printing head 4 until the cap 5 comes into close contact with the nozzle surface of the printing head 4.

Specifically, as shown in FIG. 4, when it is assumed that a distance between the upper surface of the cap 5 and the pin 14*d* of the cap supporting member 14 is designated by L1, a distance between the pin 14*d* of the cap supporting member 14 and the pin 8*d* at the lower end of the cap supporting lever 8 is designated by L2, a radius of the pin 8*d* is designated by r, an inclination angle of the cap supporting lever 8 at the position corresponding to about one o'clock of a watch is designated by $\theta$, and a distance between the deepest end of the inverted U-shaped groove 9 and the nozzle surface of the printing head 4 is designated by L3, the following inequality is established.

$$L3 < L1 + L2 \cos\theta - r$$

Thus, provided that the dimensions of the capping device are adequately preset, since the pin 8*d* at the lower end of the cap supporting lever 8 is located at the position away from the deepest end of the inverted U-shaped groove 9, the resilient force of the cap spring 11 is effectively exerted on the cap 5 via the cap supporting lever 8 so that the cap 5 is brought into close contact with the lower surface of the printing head 4 with a predetermined intensity of thrust force, resulting in an ink injection port on the cap 5 being reliably sealed with the lower surface of the printing head 4.

Even in a case where the nozzle surface of the printing head 4 is separated from the cap 5 by a distance in excess of the preset distance, since the cap spring 11 turnably displaces the cap supporting lever 8 until the pin 8*d* reaches the deepest end of the inverted U-shaped groove 9, the cap 5 comes into pressure contact with the nozzle surface of the printing head 4 with a sufficiently high contact force.

On the other hand, the turntable displacement of the cap supporting member 14 as mentioned above allows the cap fixing member 7, pivotally jointed to the cap supporting member 14 via the pins 7*a*, to be turnably displaced while it is supported by the projection 14*b* of the cap supporting member 14 in a one-point supporting fashion. As a result, the cap 5 carried by the cap fixing member 7 is correctly brought into close contact with the nozzle surface of the printing head 4.

Figure 6:
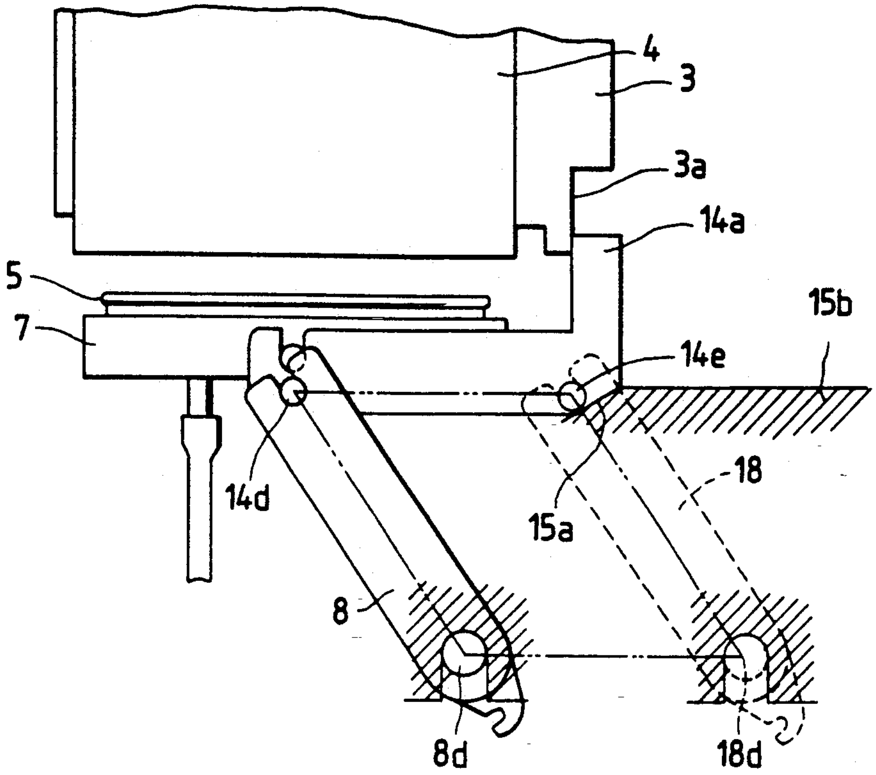
FIG. 6 is a plan view of a capping device for an ink jet printer in accordance with a second embodiment, particularly illustrating an inoperative state of the capping device before an ink jet port on a printing head is shut by the capping device.
Figure 7:
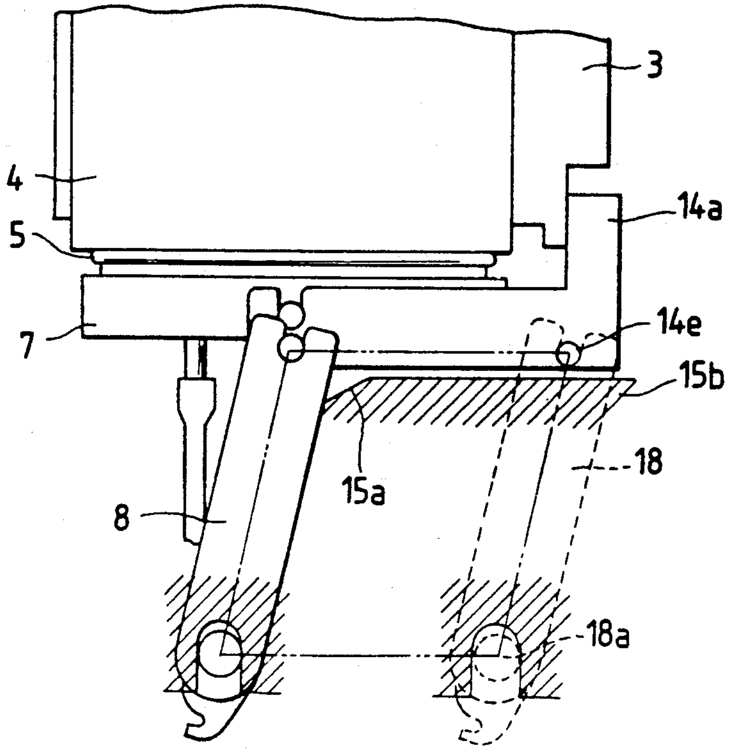
FIG. 7 is a plan view of the capping device shown in FIG. 6, particularly illustrating that the ink jet port has been shut by the capping device.

FIG. 6 and 7 illustrate a capping device in accordance with a second embodiment of the present invention. According to this second embodiment, a parallel link mechanism is constituted by two parallel cap supporting levers 8 and 18, and a cap supporting member 14 supported by both the cap supporting levers 8 and 18.

The capping device is constructed such that pins 8*d* and 18*d* on the base end side of the cap supporting levers 8 and 18 are fitted into inverted U-shaped grooves of the cap supporting levers 8 and 18, and a cap supporting member 14 is biased in the direction toward a printing head 4 by the action of a cap spring of which resilient force is exerted on the base end of at least one of the cap supporting levers 8 and 18.

Also in this embodiment, as the cap supporting member 14 is displaced from the non-capping position (see FIG. 6) to the capping position (see FIG. 7) by the thrust action of a carriage 3, it is increasingly displaced toward the nozzle surface of the printing head 4 with the aid of an inclined surface 15*a* and at the same time, a cap 5 is brought into pressure contact with the nozzle surface of the printing head 4 by the action of the cap spring of which resilient force has been exerted on at least one of the cap supporting levers 8 and 18.

Since the other structures and functions of the capping device are the same as those of the capping device in accordance with the first embodiment of the present invention, repeated description will not be required.

A second embodiment of this invention will be described with reference to the accompanying drawings.

In those drawings, reference numeral 101 designates a maintenance unit arranged in a home position outside a printing region. The maintenance unit 101 comprises: a cap 102 for sealing the ink jetting port of an ink jet head 130; a cap supporting frame 108 which supports the cap 102; and a stopper 114 for fixedly positioning the head 130 and the cap 102 at a sealing position A.

The cap 102 has a protrusion 103 so that it is returned to the sealing position A (FIG. 9) as the ink jet head 130 is returned to the home position, and it is moved to a non-sealing (or opening) position B (FIG. 8) as the head 130 is moved from the home position to the printing region. More specifically, the protrusion 103 is formed on the cap 102 at the outer end in such a manner that it is in the route of movement of the head 130 so as to abut against the outer end of the latter.

The cap supporting frame 108 operates to guide the cap 102 axially from a position spaced away from the end face 131 of the head 130 to a depressing position while the cap 102 is moved from the non-sealing position B to the sealing position A. The cap supporting frame 108 has a bent guide groove 109. One portion of the guide groove 109 is parallel with a guide shaft 132 and the remaining part forms an angle with the latter 132. The cap 102 is provided with a lever 111 which is adapted to urge the cap 102 inwardly with a spring 110, with its one end portion rotatably mounted on the cap supporting frame 108. Furthermore, a pin 104 embedded in the cap 102 at the outer end is engaged with the guide groove 109, and a pin 112 embedded in the other end portion of the lever 111 is engaged with a vertical groove 105 formed in the middle portion of the cap 102. Hence, the cap 102 is moved in the above-described manner while being held in parallel with the guide shaft 132.

Figure 8:
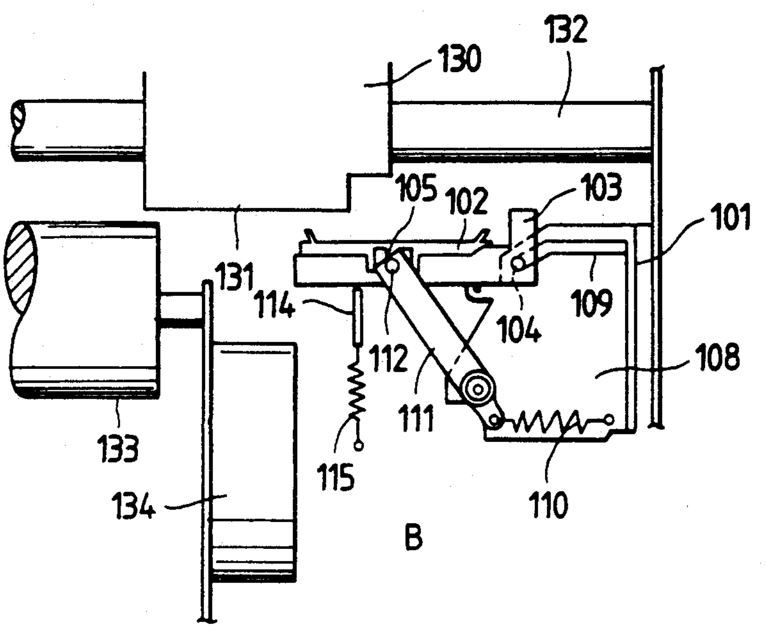
FIG. 8 is a side view showing one example of an ink jet type recording device according to a second embodiment of the present invention, in which the ink jetting port is opened.
Figure 9:
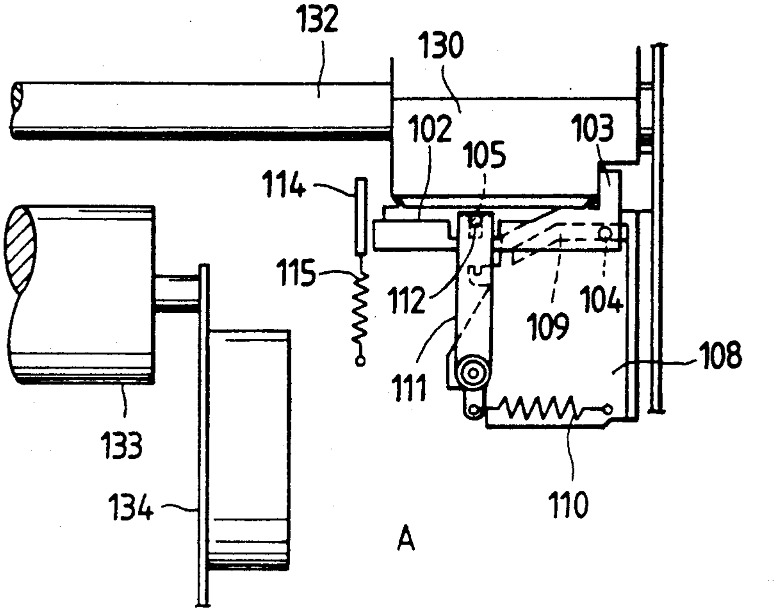
FIG. 9 is also a side view showing the recording device in which the ink jetting port is sealed.
Figure 10:
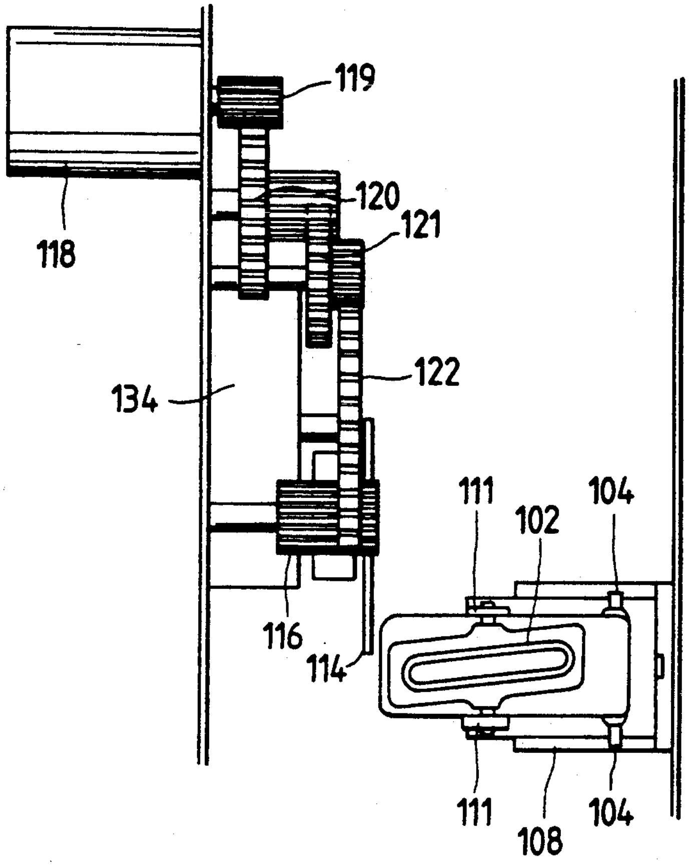
FIG. 10 is a top view of the recording device.

The stopper 114 is to fixedly position the cap 102 and the head 130 at the sealing position A. That is, the stopper 114 is able to move in and out thereby to abut against the inner end of the cap 102. During the printing operation, the stopper 114 is prevented by the lower surface of the cap 102 from moving upwardly as shown in FIG. 8. When the device is in standby state, the stopper 114 is urged by a coil spring 115 acting on its one end so that the stopper goes in the route of movement of the cap 102 as shown in FIG. 9 or the part (a) of FIG. 12. The stopper 114 has a pinion 116 as its part so that the head 130 and the cap 102 are returned to the non-sealing position B to start a printing operation. More specifically, a returning force produced by a pump motor is applied to the pinion 116 integral with the stopper 114.

Figure 11:
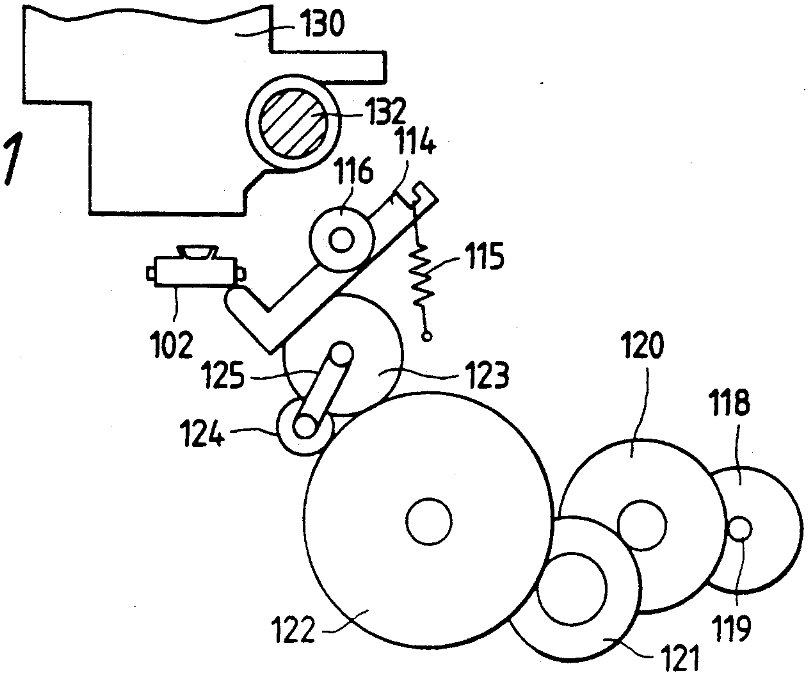
FIG. 11 is an explanatory diagram showing a gear train mechanism for operating a sealing cap in the recording device.
Figure 12A:
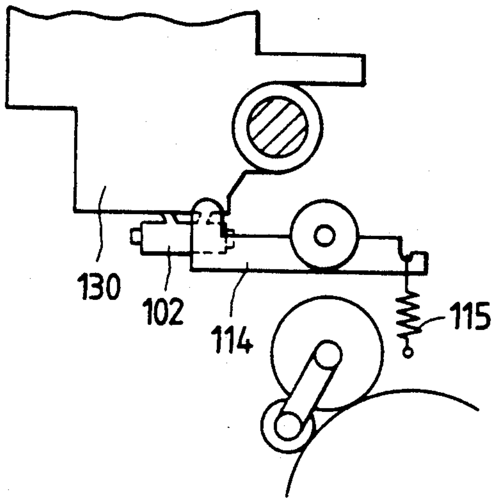
Figure 12B:
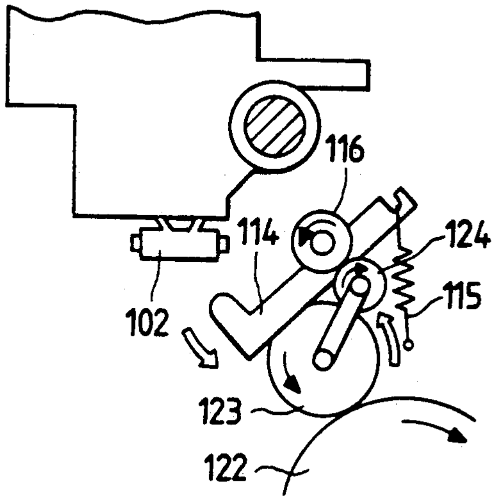
Figure 12C:
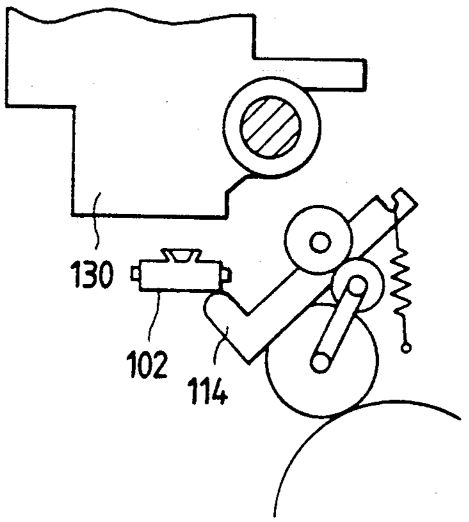
Figure 12D:
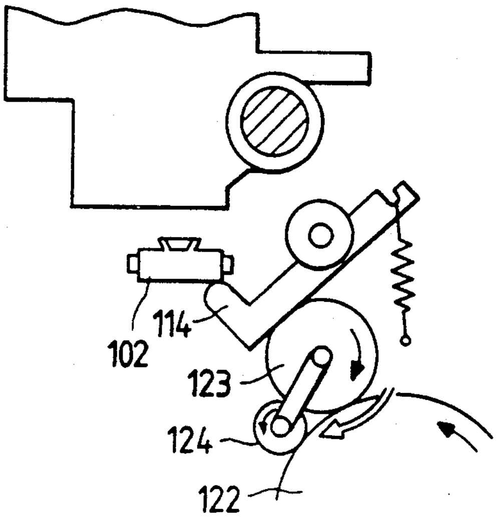

As shown in FIG. 11, the pump motor 118 has a pinion 119, which is engaged through a train of reduction gears 120 and 121 with a pump gear 122. The pump gear 122 is engaged with a recording head regulating gear 123. A planet gear 114 is coupled to the recording head regulating gear 123 with rods 125 in such a manner that the former 124 is rotated on the latter through while being engaged therewith. Hence, as the regulating gear 123 rotates, the planet gear 124 is revolved so as to engage with the pinion 116 of the stopper 115, whereby the stopper 114 is turned to the retracting position.

In FIGS. 8 and 9, reference numeral 133 designates a platen roller; and 134, a pump connected to the cap 102 through a conduit pipe (not shown).

Now, the operation of the ink jet type recording device thus organized will be described.

When the ink jet head 130 is at the printing region performing an ordinary printing operation, the cap 102 is released from the head 130. That is, as shown in FIG. 8 or 11, the cap 102 is moved inwardly by the spring acting on the other end portion of the lever 111, thus being held at the non-sealing position B remote from the end face 131 of the head 103. In this case, the stopper 114 is retracted, with its end portion abutting against the lower surface of the cap 102.

When the head 130 is returned to the home position outside the printing region after a predetermined printing operation, it 130 pushes the protrusion 103 of the cap 102 to move the latter together with the head 130 from the non-sealing position B to the sealing position A. That is, the cap is moved horizontally in FIG. 8 or 9. During this horizontal movement, the cap 102 is moved vertically along the guide groove 109 of the cap supporting frame 108 by the clockwise turn of the lever 111. As a result, the cap is brought into close contact with the end face 131 of the head without lateral displacement, thus sealing the ink jetting port. In this operation, the stopper 114 is released from the lower surface of the cap 102 when the latter 102 reaches the sealing position, and therefore the stopper 114 is turned by the elastic force of the spring 115 acting on the other end thereof, so that the end portion of the stopper goes in the route of movement of the cap 102 (FIGS. 9, and 12,(*a*)).

Hence, even if the main switch is turned off at this time instant, the head 130 is positively fixedly positioned with the ink jetting port sealed with the cap 102.

When the cap is sealed in this manner, a sequence control circuit applies a control signal to the pump motor 118 to start the latter. As the pump motor 118 is operated in this manner, the pump 134 is driven through the reduction gear train 120 and 121 and the pump gear 122, to produce a negative pressure in the cap 102, thereby to remove the ink from around the ink jetting port, and to attract the cap 102 onto the end face 131 of the head 130. As the pump gear 122 is turned clockwise, the regulating gear 123 engaged with it causes the planet gear 124 to revolve counterclockwise as shown in the part (b) of FIG. 12. As a result, the planet gear 124 is engaged with the gear 116 integral with the stopper 114, whereby the latter 114 is turned counterclockwise against the elastic force of the spring 115, as a result of which the end portion of the stopper 114 is retracted from the route of movement of the cap 102.

When, under this condition, a printing start signal is provided, the head 130 is shifted to the printing region again, being moved to the left-handled side in FIG. 8. At the same time, the cap 102 is also moved to the left-handled side in FIG. 8 by the elastic force of the spring 110 acting on the lever 111 without slipping on the head end face 131; that is, the cap 102 is returned to the non-sealing position B again.

Thereafter, the pump motor 118 is rotated in the opposite direction temporarily. As a result, the regulating gear 123 in standby state as shown in the part (c) of FIG. 12 is turned in the opposite direction as shown in the part (d) of FIG. 12 as the pump gear 122 turns counterclockwise, whereby the planet gear 124 is revolved to the original position.

In the above-described embodiment, in succession to the sucking operation of the pump 134, the retraction of the stopper 114 is carried out by the planet gear mechanism. However, the recording device may be so modified that a solenoid is used to retract the stopper 114. With this modification, the operation can be eliminated that the pump motor 118 is rotated in the opposite direction to return the planet gear 124. The same effect can be obtained by replacing the planet gear mechanism with a one-way clutch.

As was described above, in the ink jet type recording device of the present invention, the ink jetting port sealing member is arranged outside the printing region which is moved between the non-sealing position where it is away from the ink jetting port and the sealing position where it seals the latter. Hence, the sealing and opening of the ink jetting port are automatically carried out as the sealing member is moved together with the recording head. That is, the sealing and opening of the ink jetting port can be achieved without lateral displacement.

Furthermore, in the recording device, the stopper, or retaining member, retains the sealing member at least for the period of time Which elapses from the time instant that the sealing member reaches the sealing position until the attraction of the sealing member is started. Hence, even if the main switch is turned off immediately after an printing operation is accomplished, the recording head and the sealing member can be positively fixedly positioned with the ink jetting port sealed. In addition, the recording device in standby state can be placed in the printing mode quickly.

While the present invention has been described above with respect to two preferred embodiments thereof, it should of course be understood that the present invention should not be limited only to these embodiments, but various changes or modifications may be made without departure from the scope of the invention as defined by the appended claims.

What is claimed is:

1. A capping device for an ink jet printer having a carriage with a printing head thereon, said printing head having a nozzle surface and said carriage being movable through an effective writing region in which printing is performed, said device comprising:

a cap support disposed outside of the effective writing region and movable between a non-capping position and a capping position, displacing means for displacing said cap in a direction toward the nozzle surface of said printing head as said cap support is moved from the non-capping position to the capping position, wherein said displacing means includes a stationary guiding means arranged as an inclined surface for displacing said cap support toward said nozzle surface of said printing head in a direction transverse to the direction of movement of said carriage, and biasing means for biasing said cap support in said direction toward said printing head so as to allow a cap on said cap support to come into close contact with the nozzle surface of said printing head by operation of said biasing means.

2. The capping device as claimed in claim 1, wherein said displacing means comprises two components, one being said stationary guiding means for displacing a first part of said cap support toward the nozzle surface of the printing head and the other of said components being a turnable lever adapted to turn while supporting a second part of said cap support, where said second part of said cap support is closer to said effective writing region than said first part of said cap support.

3. The capping device as claimed in claim 1, wherein said displacing means comprises a pair of turnable levers for displacing said cap support toward the nozzle surface of the printing head while supporting a rear part and a forward part of said cap support in such a manner that a biasing force of said biasing means is exerted on a base end of at least one of said turnable levers.

4. The capping device as claimed in claim 1, wherein said cap support includes a hemi-spherical projection supporting central part of a lower surface of the cap at a single point of contact.

5. The capping device as claimed in claim 1, wherein said cap support further comprises a first pin and a second outer pin, where said first pin is pivotally connected to a foremost end of one of said displacement means and said second outer pin slidably moves along said inclined surface of said stationary guiding means to maintain a horizontal position as said cap is displaced toward said nozzle surface by said displacing means.

6. The capping devices as claimed in claim 4, wherein said cap support further includes two recesses and a cap fixing member having two pins pivotably supported in said recesses to permit said cap to pivot with respect to said cap support as said cap is urged toward said nozzle surface by said hemispherical projection.

7. The capping device as claimed in claim 1, wherein said carriage drives said cap support from said non-capping position to said capping position.

8. The capping device as claimed in claim 1, wherein said biasing means applies a biasing force on at least part of said displacing means to move said cap support toward said nozzle surface.

9. The capping device as claimed in claim 2, wherein a second biasing means applies a biasing force to a base end of said turnable lever.

10. The capping device as claimed in claim 2, wherein said guiding means comprises:

a pin member provided on said cap support; and a slot member formed on a cap supporting frame, said pin member being slidable within said slot.

11. The capping device as claimed in claim 1, further comprising:

a positioning and retaining means, being arranged at a first position where said cap seals said nozzle surface, for positioning and retaining said cap at least for a period of time which elapses from the time instant that said cap moves to said first position until a negative pressure is formed in said cap.

12. The capping device as claimed in claim 11, in which said positioning and retaining means comprises a stopper which is movable so as to abut against the inner end of said cap, said stopper being prevented by the lower surface of said cap from moving upwardly during the printing operation, and a spring for urging said stopper so as to go said stopper in the route of movement of said cap when the device is in standby state.

13. An ink jet type recording device in which an ink jetting port sealing member is arranged along the route of movement of a recording head and outside a printing region thereof in such a manner that said ink jetting port sealing member, abutting against a part of said recording head, is moved together with said recording head, and is moved in a direction perpendicular to the direction of movement of said recording head between a first position where said ink jetting port sealing member is spaced from a surface of said recording head which includes an ink jetting port and a second position where said ink jetting port sealing member seals said ink jetting port, a displacing means is provided for facilitating movement of said ink jetting port sealing member from said first position to said second position, wherein said displacing means includes a stationary inclined surface formed within said ink jet type recording device for displacing said ink jetting port sealing member toward said recording head in a direction transverse to the direction of movement of said recording head, and a retaining member is arranged at said second position which is adapted to position and retain said ink jetting port sealing member at least for a period of time which elapses from the time instant that said ink jetting port sealing member moves to said second position until a negative pressure is formed in said ink jetting port sealing member.

* * * * *